Sept. 5, 1933. R. W. CROSSEN, JR 1,925,091
COUPLING
Filed April 20, 1931
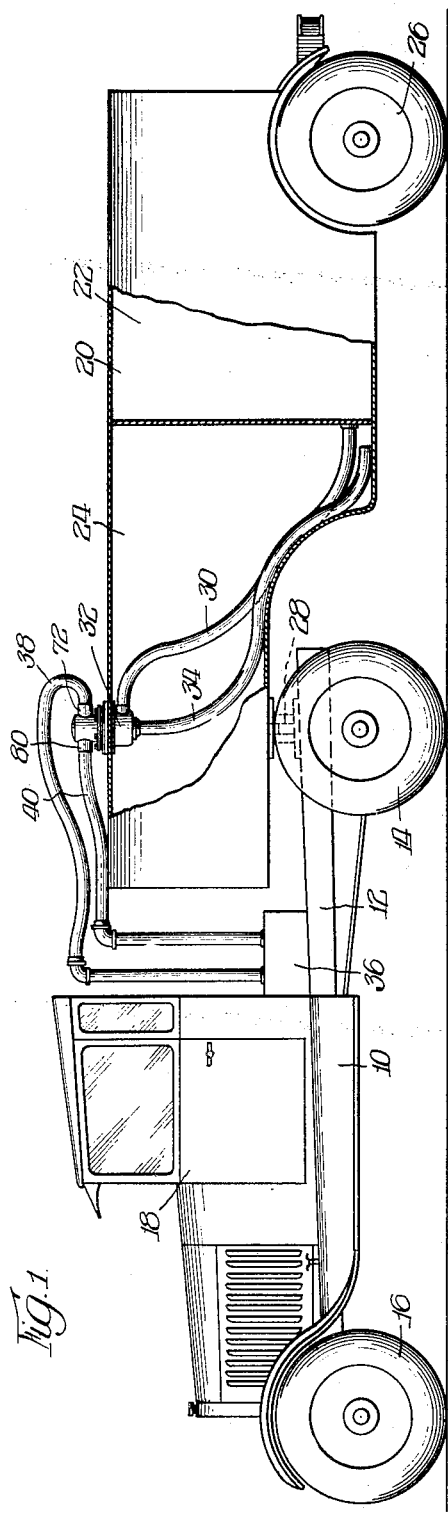
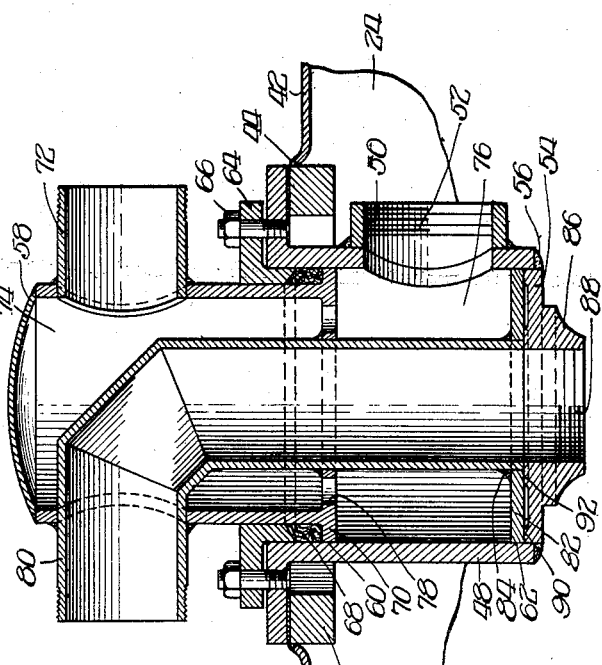
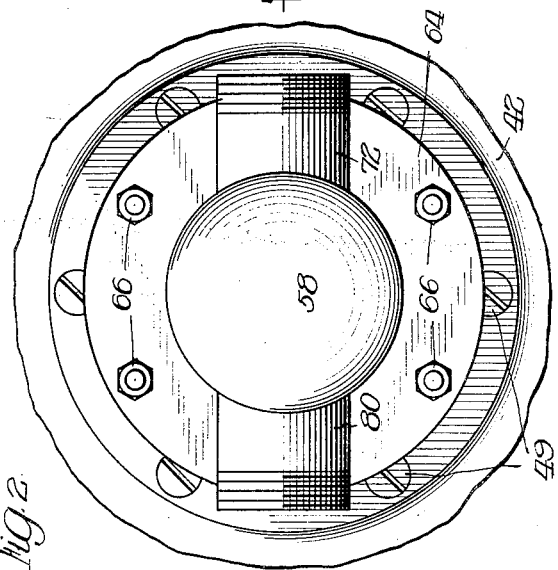
Inventor:
Robert W. Crossen Jr.,
By Wilkinson, Huxley, Byron & Knight
attys Patented Sept. 5, 1933

1,925,091

UNITED STATES PATENT OFFICE 1,925,091

COUPLING

Robert W. Crossen, Jr., Plainfield, Ill., assignor to Farrell Manufacturing Company, Joliet, Ill., a corporation of Illinois Application April 20, 1931. Serial No. 531,326

4 Claims. (Cl. 285—9)

This invention pertains to coupling devices, and more particularly to a coupling device which is adapted for use with truck trailers for tank wagons and the like.

In some of the larger capacity tank wagons the motive power is provided by a vehicle, and to this vehicle a tank trailer is pivoted. As it is more convenient and sometimes desirable to place the pumping mechanism on the vehicle, it is necessary to provide a coupling arrangement between the vehicle and the trailer which will permit relative movements between the trailer and the vehicle.

It is therefore an object of this invention to provide a coupling which will permit relative movement, particularly of rotation, between a vehicle and a tank trailer, which coupling will permit uninterrupted operation of the pumping mechanism regardless of the angular disposition of the trailer with respect to the vehicle.

Another object of the invention is to provide a simple, effective, yet inexpensive coupling arrangement adapted particularly for use between a trailer of a tank truck.

With these and various other objects in view, the invention may consist of certain novel features of construction and operation as will be more fully described and particularly pointed out in the specification, drawing and claims appended hereto.

In the drawing, which illustrates an embodiment of the device and wherein like reference characters are used to designate like parts—

Figure 1 is a side elevation, partly in section, of a tank wagon embodying the invention;

Figure 2 is an enlarged top plan view of the coupling arrangement which is the subject matter of this invention; and Figure 3 is an enlarged sectional elevation through the coupling, the same being taken substantially in the plane as indicated by the line 3—3 of Figure 2.

Referring first of all more particularly to Figure 1, the road vehicle 10 is shown provided with the chassis frame 12 and the usual driving and steering wheels 14 and 16, the vehicle being operated in the usual manner of automotive vehicles from the driver's compartment 18. The tank trailer 20, which, for the purposes of illustration is shown as provided with two distinct tanks 22 and 24, is provided with the trailer wheels 26, the trailer being of the kind having a portion of the tank 24 overlying the chassis and being pivoted thereto at the swivel connection 28. The tank 22 is connected through the hose connection 30 to the coupling 32, and tank 24 is connected to the coupling through the hose connection 34, the hose connections 30 and 34 being connected to the pump mechanism 36, disposed on the chassis 12, by means of the flexible connections 38 and 40. The center line of the coupling 32 is disposed to coincide with the center line of the swivel connection 28 so that pivotal movement of the tank trailer 20 and the vehicle 10 will not disturb the connections 38 and 40 extending from the tank to the pump 36, though this is not necessary when sufficiently long, flexible members 38 and 40 are used.

Referring more particularly to the construction of the coupling 32, the shell 42 of the tank 24 is welded as at 44 to the frame member 46 defining the opening in the tank. The housing 48 is connected to the frame member 46 as at 49 and is provided with a port or connection 50 to which the hose 30 may be secured, the port being suitably threaded as at 52. The bottom of the housing 48 is closed by means of a head 54 which, as shown, is welded thereto as at 56. A movable housing 58 is disposed to have a portion extending within the housing 50, having bearing engagement therewith as at 60 and 62, there being provided a gland 64 secured to the housing 50 as at 66, packing 68 being disposed between the gland and the flange 70 to prevent leakage of liquid. The housing 58 is provided with the connection 72 for the flexible connection 38, the connection 72 opening inwardly into the chamber 74 provided in the head of the coupling. The chamber 74 communicates with the chamber 76 formed in the lower portion of the coupling through the ports 78. The housing member 58 is also provided with the connection 80 to which the flexible connection 40 may be secured, the connection 80 having a portion extending downwardly, and being provided with the head 82 welded thereto as at 84, the head 82 having bearing engagement as at 62 with the housing 48, the head 54 being apertured and provided with the connection 86 threaded as at 88 for connection to the hose 34.

In operation it will be appreciated that when relative movement occurs between the housings 58 and 48, bearing engagement at 60—62 and at 90—92 between the heads 54 and 82 permits ready rotation between the parts without affecting their function at all. Liquid drawn in through the connection 52 flows through the chamber 76 into the chamber 74 through the ports 78 and is drawn outwardly through the connection 72, while liquid drawn through the connection 88 is drawn upwardly and outwardly through the connection 80.

Of course, there are many other uses to which this sort of coupling may be put, and it is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. A fluid conveying swinging joint for a pair of individual fluid conveying conduits comprising, a fixed housing having spaced conduit connections thereto, a rotatable housing having spaced conduit connections thereto, said rotatable housing being seated in said fixed housing, means secured to said fixed housing member for forcing said rotatable housing member into seated position and for sealing the joint between said housing member and individual passageways in said housing members between the conduit connections to the respective housing members.

2. A fluid conveying swinging joint for a pair of individual fluid conveying conduits comprising, a cup-shaped housing member secured in fixed position, a second housing member slidably inserted through the open end of said cup-shaped member and rotatably seated therein, said second housing member having an annular flange adjacent the top of said cup-shaped housing member, a packing gland secured to the top of said fixed housing member for sealing the joint between said members and for holding said rotatable housing member in seated position by pressure upon said flange, spaced fluid conduit connections to each of said housing members and individual pasageways in said housing members between the respective conduit connections.

3. A fluid conveying swinging joint for a pair of individual fluid conveying conduits comprising, a cup-shaped housing member secured in fixed position, a conduit connection to the bottom of said housing, a conduit connection to the side of said housing, a second housing member telescoped within said first housing member, a pair of spaced flanges on said second housing member closely fitting the inner walls of said cup-shaped housing member, a tubular fluid conveying passageway extending through said second housing member into communication with the conduit connection at the bottom of said fixed housing, a second fluid conveying passageway in said second housing member surrounding said first passageway and in communication with the conduit connection to the side of said first housing member, a packing gland secured to said first housing member for sealing the joint between said housings and for holding said housings against relative axial displacement through pressure upon one of said flanges.

4. A fluid conveying swinging joint for a pair of individual fluid conveying conduits comprising a cup-shaped housing secured in fixed position, a conduit connection to the bottom of said housing member, a conduit connection to the side of said housing member, a second housing member comprising a substantially cylindrical chambered casing, a conduit connection leading into said chambered casing, a tubular conduit leading through said chambered casing and extending downward with respect thereto, a flange at the lower end of said tubular conduit adapted to closely fit into the cup-shaped housing member and to seat at the bottom thereof, whereby said tubular conduit is placed in communication with the conduit connection at the bottom of said cup-shaped housing, openings in the bottom of said chambered casing around said tubular conduit placing said chambered casing in communication with the conduit connection to the side of said cup-shaped housing and packing means adjustably secured to said first housing for holding said housing members against relative axial displacement but permitting relative rotation therebetween.

ROBERT W. CROSSEN, Jr.